United States Patent [19]

Spence

[11] Patent Number: 5,007,557

[45] Date of Patent: Apr. 16, 1991

[54] SPILL CONTAINER WITH UNFOLDING FLEXIBLE COMPARTMENT

[76] Inventor: James Spence, 310 Blantyre Avenue, Scarborough, Ontario, Canada, M1N 2S7

[21] Appl. No.: 495,806

[22] Filed: Mar. 19, 1990

[51] Int. Cl.⁵ .............................................. B65D 25/02
[52] U.S. Cl. ..................... 220/571; 220/501; 220/404; 220/4.03; 220/9.1; 119/5; 137/313
[58] Field of Search ............... 137/312, 313; 119/5; 220/1 C, 404, 403, 9.1, 4 A, DIG. 6, 20.5, 501, 571

[56] References Cited

U.S. PATENT DOCUMENTS

| | | | |
|---|---|---|---|
| 3,044,209 | 7/1962 | Roach | 119/5 |
| 3,377,766 | 4/1968 | Nelson | 220/403 |
| 3,658,035 | 4/1972 | Harris | 119/5 |
| 3,756,294 | 9/1973 | Rainey | 137/312 |
| 3,759,223 | 9/1973 | D'Andrea | 119/5 |
| 4,054,184 | 10/1977 | Marcinko | 220/1 C |
| 4,153,155 | 5/1979 | Benno | 206/150 |
| 4,367,198 | 1/1983 | Scordato et al. | 220/501 |
| 4,392,552 | 7/1983 | Partridge | 220/1 C |
| 4,610,039 | 9/1986 | Stern | 220/404 |
| 4,765,360 | 8/1988 | Baird | 137/312 |
| 4,781,472 | 11/1988 | LaFleur et al. | 220/403 |
| 4,862,909 | 9/1989 | Kim | 137/150 |
| 4,863,339 | 9/1989 | Krein | 220/403 |
| 4,877,261 | 10/1989 | Heisson | 220/1 C |
| 4,895,250 | 1/1990 | Schifrin | 220/404 |

*Primary Examiner*—Stephen Marcus
*Assistant Examiner*—S. Castellano
*Attorney, Agent, or Firm*—Rogers, Bereskin & Parr

[57] ABSTRACT

A spill container advantageously adapted for use in conjunction with a conventional aquarium is provided. The spill container comprises a receptacle for receiving leaking fluid, and a flexible water-proof compartment for receiving a flow of fluid from the receptacle. The receptacle comprises a containing wall defining a hollow fluid-trapping vessel, an inlet opening for receiving the leaking fluid, and an outlet opening connecting the receptacle to the flexible water-proof compartment. The flexible water-proof compartment comprises a base, a side wall and an inlet opening in fluid communication with the receptacle outlet opening, the flexible water-proof compartment storable in a retracted fluid-receiving position adjacent to the receptacle and extendibly responsive without human intervention to a fluid pressure exerted through the outlet opening by a fluid column in the receptacle, whereby the spill container is adapted to expandably accommodate an accidental leak of volume exceeding the fluid volume of the receptacle without spillover from the receptacle.

19 Claims, 2 Drawing Sheets

SPILL CONTAINER WITH UNFOLDING FLEXIBLE COMPARTMENT

FIELD OF THE INVENTION

The present invention relates to a spill container for use in conjunction with a leak susceptible fluid container. The invention is particularly advantageous for use in conjunction with an aquarium of the type conventionally sold for home use.

BACKGROUND OF THE INVENTION

It is known to construct a spill container in the form of a drainage pan provided with means at the base thereof for supporting a leak susceptible fluid container. It is known to provide such drainage pan with means to drain fluid from the pan into a receptacle or drainage facility. For example, it is known to construct the pan having a downwardly sloping bottom wall leading to a drainage spout to provide passive drainage into a drainage facility under the influence of gravity without human intervention such as disclosed in U.S. Pat. No. 4,765,360 issued on Aug. 23, 1988 to Baird. Other known drainage means include a spigot and a manually operable suction pump operatively attached to the drainage pan such as described in U.S. Pat. No. 4,862,360 issued on Sept. 5, 1989 to Kim.

These prior art spill containers are not well suited for containing accidental leaks that might go unnoticed for an extended period of time, where the leaked fluid volume might exceed the volume of the drainage pan, and particularly more severe leaks where the leak rate exceeds the rate of drainage into the drainage facility. In Baird where human intervention is not required to prevent spillover from the drainage pan, the spill container is designed to be used in conjunction with an accessible drainage facility.

SUMMARY OF THE INVENTION

The spill container of the present invention is adapted for use in the absence of an accessible drainage facility and remedial intervention to prevent spillover from the container and may be conveniently designed to accommodate a large volume spill that rapidly fills the spill container. This is accomplished without significant enlargement of the basic structure of the spill container.

According to the preferred embodiment of the present invention, we provide a spill container that is particularly advantageous to accommodate accidental leakage from a home aquarium which is located in an area inaccessible to a drainage facility. This spill container provides a base of suitable dimension for supporting the aquarium on a conventional type of support pedestal or table. The spill container may accommodate the entire volume of water in the aquarium without human intervention to drain the spill container.

According to the invention as claimed herein, we provided a spill container comprising a flexible waterproof compartment openly connected to a primary leak collecting vessel to receive a flow of fluid therefrom. This compartment is foldably flexible so that it can be suitably folded, bent, or rolled into a volume-reduced storage position adjacent to the primary leak collecting vessel. The flexible compartment is adapted to be stored in a configuration which is unfoldably responsive to fluid pressure exerted through an aperture connecting the flexible compartment to the primary leak collecting vessel, thereby accommodating a large volume leak without spillover. The connecting aperture is preferably large to accommodate rapid leakage.

Thus, according to a broad formulation of the invention as claimed herein, we provide a spill container adapted for use in conjunction with a leak susceptible fluid container, said spill container comprising a receptacle for receiving leaking fluid, and a flexible waterproof compartment openly connected to the receptacle for receiving a flow of fluid therefrom, the receptacle comprising a containing wall defining a hollow fluid trapping vessel, a first opening for receiving the leaking fluid, and a second opening connecting the receptacle to the flexible water-proof compartment, the flexible waterproof proof compartment comprising a base portion, a side wall portion and a third opening sealably continuous with the second opening, said flexible water-proof compartment storable in a retracted fluid-receiving position adjacent to said receptacle and extendably responsive without human intervention to a fluid pressure exerted through said second aperture by a fluid column in the receptacle, whereby said spill container is adapted to extendably accommodate an accidental leak of volume exceeding with fluid volume of the receptacle without spillover from the receptacle.

The spill container of the present invention may be used in conjunction with any leak susceptible fluid container including a water tank, a water basin, a drum, an aquarium, a water column, a pipe section, and the like.

In many applications, the spill container is preferably provided with means to support the container on the ground. The primary receptacle may have a flat bottom wall for this purpose, or alternatively may be provided with legs for support purposes.

The spill container of the present invention may be placed under an independently supported leak susceptible fluid container. Alternatively, the leak susceptible container may be supported within the receptacle directly on the bottom wall thereof, or on means adapted to support the leak susceptible container in spaced relation above the bottom wall.

The flow of fluid from the receptacle to the flexible water-proof compartment may be gravitationally enhanced by mounting the spill container on a pedestal or table to enable the flexible compartment to be displaced below the "leading lip" of the opening connecting the receptacle to the flexible water-proof compartment that is the second opening. The term "leading lip" is used to refer to the lowest rim of this opening and is intended to refer primarily to a lower rim of an opening in a side wall of the receptacle. The leading lip of the second opening may be displaced vertically upward from the bottom wall of the receptacle to prevent wetting of the flexible waterproof compartment unless the leak is of a certain minimum volume.

It will be appreciated that the second opening connecting the receptacle to the flexible water-proof compartment may be suitably located in the bottom wall portion of the receptacle. Therefore, the "leading lip" may refer to any rim of the second opening over which the leaked fluid flows into the flexible compartment for retention therein.

It will be appreciated that a variety of means may be employed to gravitationally enhance the flow of leak fluid into the flexible water-proof compartment. For example, the bottom wall of the receptacle may be slanted toward the "leading lip" of the second opening to facilitate flow.

For esthetic purposes, it may be desirable to provide means to conceal the flexible water-proof compartment when it is in the stored position. This may be accomplished in a variety of ways. For example, the flexible water-proof compartment may be concealably accommodated behind a valence or a loosely swinging vertically-suspended trap door attached the base of the spill container.

BRIEF DESCRIPTION OF DRAWINGS

The invention will now be described with reference to the drawings, of which.

DETAILED DESCRIPTION OF THE PREFERRED EMBODIMENT

Figure 1:
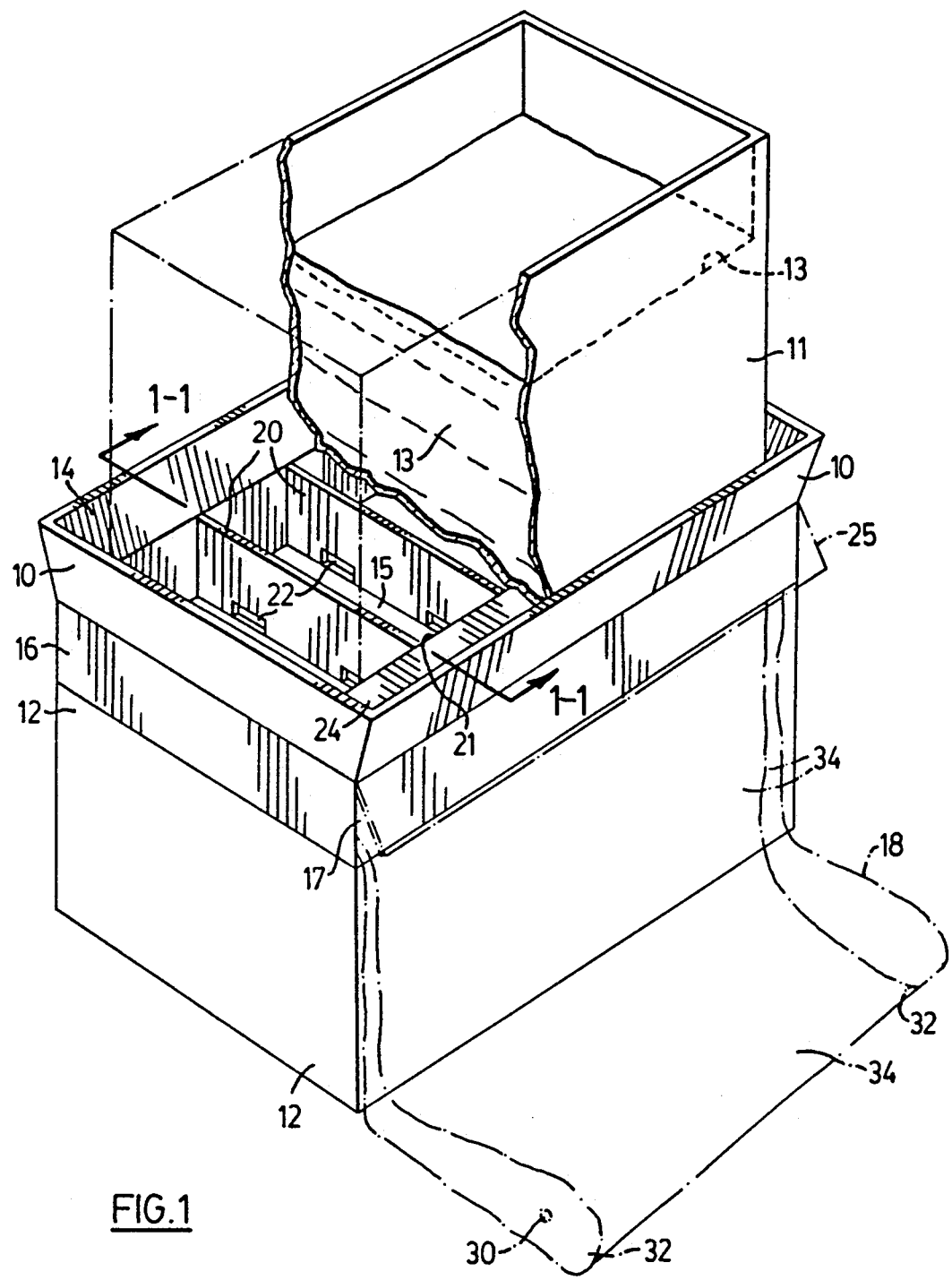
FIG. 1 is an isometric view of the preferred embodiment of the invention. The receptacle is shown mounted on a pedestal and supporting a conventional aquarium. The flexible water-proof compartment is shown in an extended position.

As illustrated in FIG. 1, the receptacle 10 is shown mounted on a pedestal 12. A rectangular aquarium 11, filled with water 13, is mounted within the opening of the receptacle on supporting walls 20. The receptacle is rectangular to efficiently and esthetically accommodate a rectangular aquarium. Thus the side wall 16 of the receptacle has four facets extending around the bottom wall of the receptacle 15. A large aperture 17 extends across the length of the one facet of the side wall as better illustrated in section in FIG. 2. A vertically suspended trap door 25 overlies the aperture to conceal the flexible water-proof compartment 18. This compartment is shown in an extended or unrolled position lying adjacent to the pedestal 12. The flexible water-proof compartment generally comprises a terminal bottom portion 32 and a side wall portion 34. The flexible water-proof compartment 18 is provided with a spigot 30 to drain the compartment in the event of a spill.

It will be appreciated that it is important to mount the spill container in area where the flexible water-proof compartment can freely extend and unroll to accommodate a spill.

Figure 2:
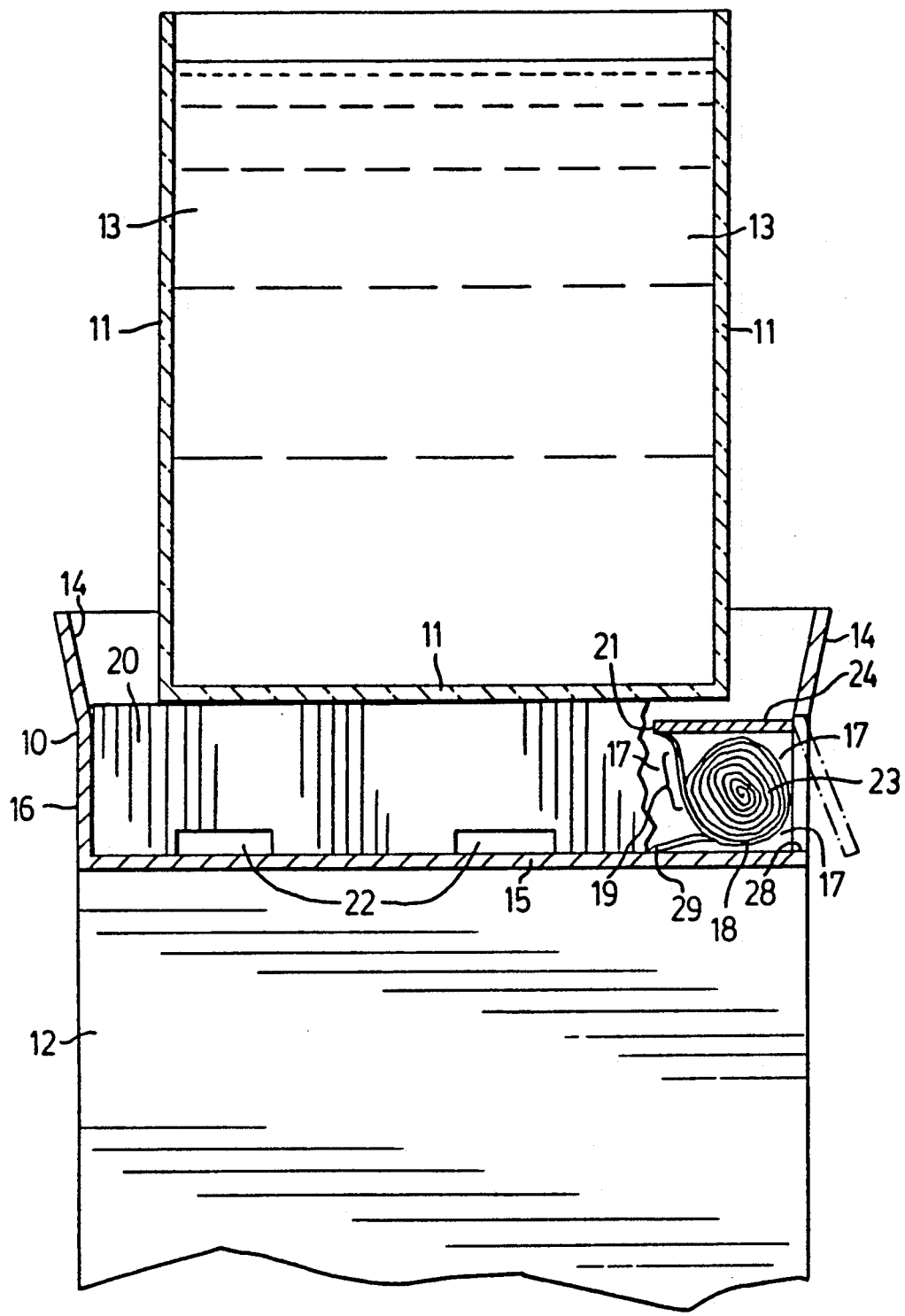
FIG. 2 is a side elevation in section of the preferred embodiment illustrated in FIG. 1, showing the flexible compartment in stored position within the receptacle.

The side wall 16 has an outwardly flared rim portion 14 to effectively trap fluid leaking from the aquarium. The receptacle is provided with parallel walls 20 traversing the bottom wall of the receptacle. These walls lie in a plane perpendicular to the opening 17 to channel fluid flow towards the opening. In order to ensure that the flexible water-proof compartment unrolls uniformly, the subcompartment walls are provided with apertures 22 to equalize the height of the water column in each subcompartment. The sub-compartment walls serve primarily to support the aquarium but also serve to reduce turbulence in the event of a rapid large volume leak from one side of the aquarium. The receptacle is also provided with a front wall 24 terminating in free edge 21. The free edge 21 serves as a suitable point of attachment for the flexible water-proof compartment as illustrated in FIG. 2. As illustrated in FIG. 2, the flexible water-proof compartment is stored under the wall 24.

In FIG. 2, the spill container and aquarium are seen in vertical section along line 1-1. The flexible water-proof compartment is folded into a rolled format 23. The open end of the compartment is sealably attached to the free end 21 of wall 24, to bottom wall 15 at point 29 and to the sidewall (point of attachment not shown). As illustrated, the flexible water-proof compartment is rolled in a fashion which permits it to be suitably unraveled by water pressure exerted through opening 17 on area 19. The rolled compartment 23 unravels in the direction of the arrow for movement towards trap door 25 and over leading lip 28. Sustained fluid pressure will displace the trap door towards the position illustrated by the dotted line in FIG. 2 and permit the compartment to fully unravel in the fashion illustrated in FIG. 1.

The receptacle walls may be constructed of any suitable water-proof material, such as plastic, plexiglas or various plastic polymers.

The flexible water-proof compartment may be constructed from any flexible water-proof material. The flexible water-proof compartment and receptacle may be suitably dimensioned to accommodate the entire volume of the leak susceptible fluid container without spillover. When used in conjunction with the preferred embodiment described above, the flexible water-proof compartment is preferably retracted into a rolled storage position to facilitate within the space provided between the support 24 and the base 15. For this purpose, it is preferable to avoid using a material that is resilient and susceptible of unraveling in the stored position. Other retraction patterns and storage designs may call for a resilient material to facilitate extension.

I claim:

1. A spill container adapted for use in conjunction with a leak susceptible fluid container, said spill container comprising a receptacle for receiving leaking fluid, and a foldably flexible water-proof compartment openly connected to the receptacle for receiving a flow of fluid therefrom, the receptacle comprising a containing wall defining a hollow fluid-trapping vessel, a first opening for receiving leaking fluid, and a second opening connecting the receptacle to the flexible water-proof compartment, the flexible water-proof compartment comprising a base portion, a side wall portion and a third opening sealably continuous with the second opening, said flexibly water-proof compartment storable in a retracted fluid-receiving position adjacent to the receptacle and unfoldably responsive without human intervention to a fluid pressure exerted through the second opening by a fluid column in the receptacle, whereby said spill container is adapted to extend to accommodate an accidental leak of volume exceeding the fluid volume of the receptacle without spillover from the receptacle.

2. A spill container as defined in claim 1, wherein said receptacle and said flexible water-proof compartment are suitably dimensioned to accommodate the entire volume of said leak susceptible fluid container without spillover.

3. A spill container as defined in claim 1, wherein the containing wall of the receptacle comprises a bottom wall portion forming a base for the spill container and a side wall portion sealably connected to said bottom wall portion.

4. A spill container as defined in claim 3, further comprising support means for supporting said leak susceptible fluid container within said first opening.

5. A spill container as defined in claim 4, wherein the bottom wall portion of the receptacle is adapted to support said leak susceptible fluid container with the receptacle.

6. A spill container as defined in claim 5, wherein said support means is adapted to support the leak susceptible fluid container in spaced relation above the bottom wall portion of said receptacle.

7. A spill container as defined in claim 3, further comprising means to gravitationally enhance fluid flow through said second aperture.

8. A spill container as defined in claim 3, further comprising means to channel the flow of fluid symmetrically through said second aperture.

9. A spill container as defined in claim 3, further comprising means to reduce turbulence within the receptacle.

10. A spill container as defined in claim 8, comprising at least one dividing wall transversing the receptacle for sub-dividing the receptacle into sub-compartments, said dividing wall provided with at least one aperture to equalize the water levels within said sub-compartments to provide uniform flow through said second aperture.

11. A spill container as defined in claim 9, comprising at least one dividing wall transversing the receptacle for sub-dividing the receptacle into sub-compartments, said dividing wall lying in a plane perpendicular to said second opening, said dividing wall provided with at least one aperture to equalize the water levels within said sub-compartments to provide uniform flow through said second aperture.

12. A spill container as defined in claim 7, wherein said bottom wall portion is angled downwardly towards said second aperture to enhance the gravitational flow of fluid through said second aperture.

13. A spill container as defined in claim 3, wherein said flexible water-proof compartment is displaceable vertically below the bottom wall portion of the receptacle.

14. A spill container as defined in claim 3, wherein the flexible water-proof compartment is displaceable below a leading lip of said second aperture.

15. A spill container as defined in claim 3, wherein said second aperture is located in said sidewall portion.

16. A spill container as defined in claim 3, wherein said flexible water-proof compartment is a water-proof bag.

17. A spill container as defined in claim 16, wherein said flexible water-proof compartment is stored in a retracted rolled position in parallel orientation to said second aperture for unrolling and extending away from said aperture in response to said fluid pressure.

18. A spill container as defined in claim 17, further comprising means to conceal the flexible water-proof compartment when stored in a rolled position.

19. A spill container as defined in claim 17, wherein said flexible water-proof compartment further comprises means for drawing the compartment.

* * * * *

UNITED STATES PATENT AND TRADEMARK OFFICE
CERTIFICATE OF CORRECTION

PATENT NO. : 5,007,557
DATED : April 16, 1991
INVENTOR(S) : James Spence

It is certified that error appears in the above-indentified patent and that said Letters Patent is hereby corrected as shown below:

At column 2, line 4: replace "we" by --I--;

At column 5, line 2: replace "the" by --said--;

At column 5, lines 7, 10, 19, 27, and column 6, lines 3, 4, 11, 13, 20: replace "aperture" by --opening--; and At column 5, lines 18 and 25: replace "water" by --fluid--.

Signed and Sealed this

Seventh Day of July, 1998

Attest:

BRUCE LEHMAN

*Attesting Officer*  *Commissioner of Patents and Trademarks*